US012212556B2

(12) United States Patent
Singh et al.

(10) Patent No.: US 12,212,556 B2
(45) Date of Patent: Jan. 28, 2025

(54) EFFICIENT TRANSMISSION OF COMPRESSED CERTIFICATES IN A LOW BANDWIDTH MESH ENVIRONMENT

(71) Applicant: ITRON, INC., Liberty Lake, WA (US)

(72) Inventors: Kalvinder Pal Singh, Miami (AU); Zoltan Peter Kiss, Los Altos, CA (US); Darin Byron Johnson, San Jose, CA (US)

(73) Assignee: ITRON, INC., Liberty Lake, WA (US)

( * ) Notice: Subject to any disclaimer, the term of this patent is extended or adjusted under 35 U.S.C. 154(b) by 253 days.

(21) Appl. No.: 17/541,193

(22) Filed: Dec. 2, 2021

(65) Prior Publication Data

US 2023/0179585 A1 Jun. 8, 2023

(51) Int. Cl.
*H04L 29/06* (2006.01)
*H04L 9/40* (2022.01)

(52) U.S. Cl.
CPC ........ *H04L 63/0823* (2013.01); *H04L 63/102* (2013.01); *H04L 63/20* (2013.01)

(58) Field of Classification Search
CPC .. H04L 63/0823; H04L 2209/30; H04L 63/20
See application file for complete search history.

(56) References Cited

U.S. PATENT DOCUMENTS

| | | | | |
|---|---|---|---|---|
| 2011/0202759 A1* | 8/2011 | Hubbell | ................ | H04L 9/3263 713/156 |
| 2014/0330986 A1* | 11/2014 | Bowes | .................... | H04L 9/007 709/247 |
| 2016/0143075 A1* | 5/2016 | Tucker | ................ | H04L 63/0823 370/329 |
| 2016/0323104 A1* | 11/2016 | Mayers | ............... | H04L 63/0407 |
| 2018/0205722 A1* | 7/2018 | Getschmann | ....... | H04L 63/0876 |
| 2019/0044738 A1* | 2/2019 | Liu | ......... | H04W 4/40 |
| 2021/0021434 A1* | 1/2021 | Barnes | .................... | H04L 9/006 |
| 2023/0179585 A1* | 6/2023 | Singh | .................... | H04L 63/102 726/10 |

OTHER PUBLICATIONS

Rescorla, E., The Datagram Transport Layer Security (DTLS) Protocol Version 1.3 draft-ietf-tls-dtls13-40, Internet-Draft, Google, Inc. Jan. 20, 2021, 57 pages.
Ghedini, A., TLS Certificate Compression, Internet Engineering Task Force (IETF) Google, Dec. 2020, 6 pages.
Raza, S., CBOR Encoding of X.509 Certificates (CBOR Certificates) draft-mattsson-cose-cbor-cert-compress-06, Network Working Group, Nexus Group, Jan. 19, 2021, 40 pages.
(Continued)

*Primary Examiner* — Dao Q Ho
(74) *Attorney, Agent, or Firm* — Artegis Law Group, LLP

(57) ABSTRACT

Various embodiments set forth a method comprising receiving, at a server node from a client node, a client compression dictionary that includes one or more first mappings between one or more first index values and one or more data entries included in a certificate cache of the client node; identifying, in response to receiving the client compression dictionary and based on the client compression dictionary, one or more certificates that should be transmitted to the client node; and transmitting, from the server node to the client node, the one or more identified certificates.

17 Claims, 5 Drawing Sheets

(56) References Cited

OTHER PUBLICATIONS

Santesson, S., Transport Layer Security (TLS) Cached Information Extension, Internet Engineering Task Force (IETF), Jul. 2016, 17 pages.
Wouters, P. Ed., Using Raw Public Keys in Transport Layer Security (TLS) and Datagram Transport Layer Security (DTLS), Jun. 2014, 18 pages.
International Search Report for Application No. PCT/US2022/051568 dated Mar. 10, 2023.

\* cited by examiner

EFFICIENT TRANSMISSION OF COMPRESSED CERTIFICATES IN A LOW BANDWIDTH MESH ENVIRONMENT

BACKGROUND

Field of the Various Embodiments

Various embodiments relate generally to wireless networks and, more specifically, to efficient transmission of compressed certificates in a low bandwidth mesh environment.

Description of the Related Art

A wireless network can include several different types of nodes that are coupled to one another and configured to wirelessly communicate with one another. Two types of nodes included in many wireless networks are mains-powered device (MPD) nodes and battery-powered device (BPD) nodes. MPD nodes are coupled to mains power, such as a power grid, and have continuous access to power when performing various node activities. BPD nodes are powered with battery cells, such as lithium-ion battery cells, and have to perform node activities using only the limited amount of power available through those battery cells.

When a given BPD node joins a wireless network, the given BPD node typically identifies one or more neighboring nodes that already have network access and initiates a certificate exchange with the neighboring node(s). To initiate the certificate exchange with an identified neighboring node, the given BPD node transmits a certificate chain to the neighboring node. In response, the given BPD node receives a certificate chain from the neighboring node. Based on the exchanged certificate chains, the given BPD node and the neighboring node establish identity and authentication between each other, and the neighboring node can then provide the given BPD node with network access. Subsequently, additional nodes can join the wireless network by performing a certificate exchange with the given BPD node. Certificate chains usually include several certificates and can sometimes be quite large

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
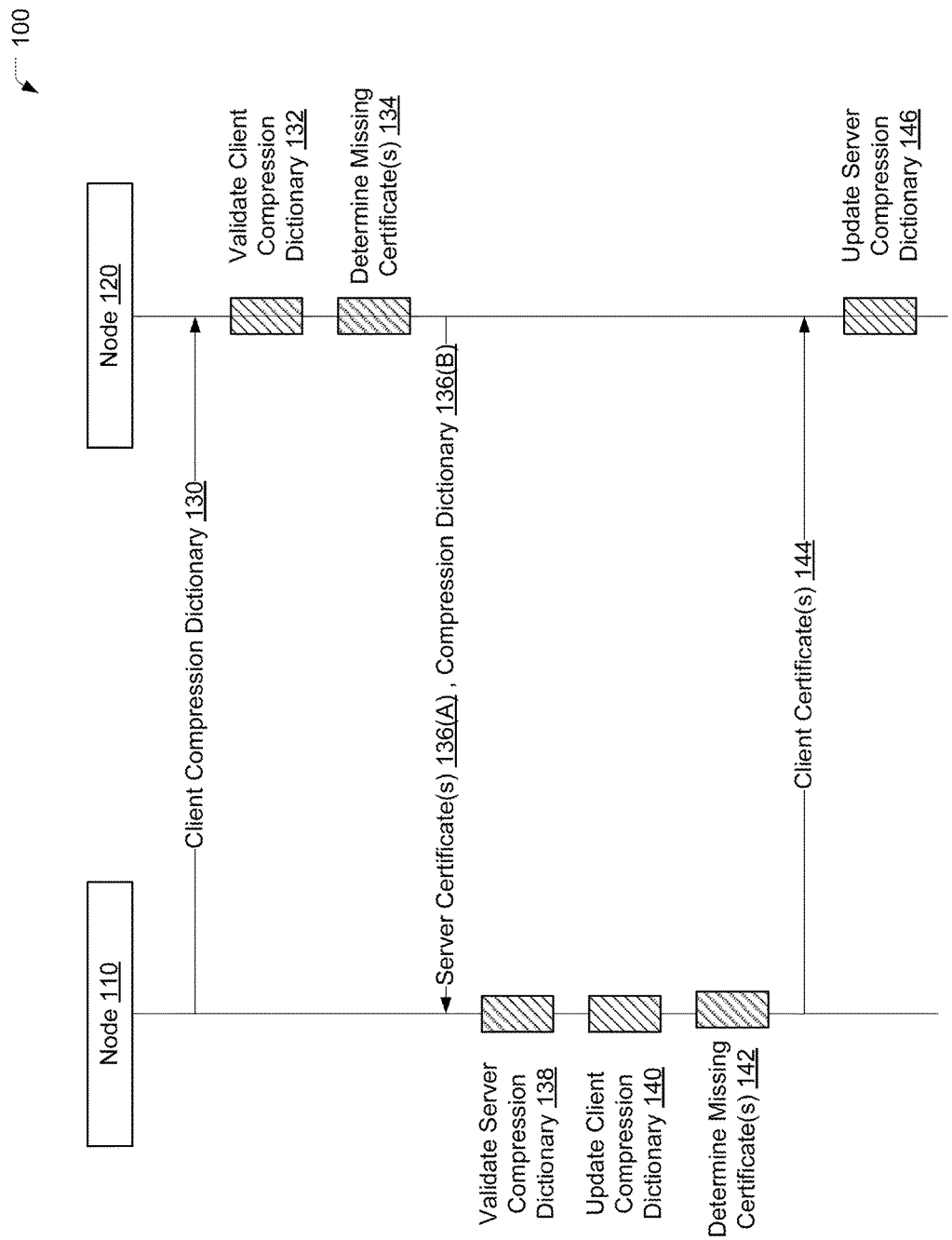
FIG. 1 illustrates an example call flow diagram showing interactions between two of the nodes of a network system, according to various embodiments.

In the following description, numerous specific details are set forth to provide a more thorough understanding of the various embodiments. However, it will be apparent to one of skilled in the art that the inventive concepts may be practiced without one or more of these specific details.

Some BPD nodes have a long expected operational life (e.g., twenty years or more), and conserving battery power is important for extending the operational life of the BPD node. However, each time the BPD node transmits data or performs processing operations, e.g, for authenticating communications with other nodes, the BPD node expends power. Accordingly, when a BPD node handles large certificate chains, the node expends a substantial amount of battery power transmitting a certificate chain to a given neighboring node and then receiving and processing a certificate chain transmitted back by that neighboring node. Expending the limited battery power of a BPD node in this fashion can reduce the operational life of the BPD node or can result in the battery cells of the BPD node needing premature replacement, which is time-consuming and expensive.

One approach for reducing the size of a certificate chain is to compress the certificates included in the certificate chain. Data compression techniques, however, typically rely on the data being compressed including discernible patterns, for example, by mapping common strings of data to different, shorter sequences of bits. In contrast, a certificate usually includes random data, such as public keys. Because the random data does not include any discernible patterns, the random data cannot be effectively compressed using typical data compression techniques. As a result, compressing a certificate does not significantly reduce the size of the certificate.

As discussed below, one solution to the above problems is for nodes to share a compression dictionary with a neighboring node prior to exchanging certificates with the neighboring node. A first node determines, based on the compression dictionary received from a neighboring node, which certificates are already included in a certificate cache of the neighboring node and which certificates, if any, the first node should transmit to the neighboring node. Similarly, the neighboring node determines, based on the compression dictionary received from the first node, which certificates are already included in a certificate cache of the first node and which certificates, if any, the neighboring node should transmit to the first node.

One benefit of the above approach is that the number of certificates transmitted by the nodes is reduced by not transmitting duplicative certificates. Because the nodes are able to reduce the number of certificates in the certificate chain that the nodes transmits to a neighboring node, the node consumes less battery power and less bandwidth when transmitting certificates compared to approaches where nodes transmit all the certificates included in a certificate chain.

Additionally, nodes can compress portions of the transmitted certificates by replacing data entries included in the transmitted certificates with index values included in the compression dictionary. The index values are encoded using fewer bits than the corresponding data entries. Therefore, the compressed certificate is also smaller in size compared to the original, uncompressed certificates. Accordingly, the node is able to further reduce power consumption and bandwidth usage by transmitting the compressed certificates instead of uncompressed certificates.

Certificate Transmission and Compression Dictionary Update

To establish an authenticated communication channel with a neighboring node, a node performs a certificate exchange procedure with the neighboring node. The node transmits a certificate chain to the neighboring node and receives a certificate chain from the neighboring node. The certificate chain of the node includes one or more certificates that include identifying information that can be used by the neighboring node to establish an encrypted communication channel with the node. The one or more certificates include, for example, a customer certificate corresponding to the node, an operator certificate corresponding to an operator or owner of the node, intermediate certificates, a root certificate, and the like. As discussed herein, in various instances such a certificate exchange may be performed with certain certificates in the chain compressed and/or omitted.

In some instances, prior to transmitting a certificate chain to a neighboring node, the node performs one or more compression operations on the certificate chain to generate a compressed certificate chain. The node stores a compression dictionary that includes mappings between relatively small index values and relatively larger data values that are found in the uncompressed certificate chain. The index values could be any type or combination of letters, numbers, characters, and/or other types of data values. In some embodiments, the data entries included in a compression dictionary are data entries that are found in multiple certificates of a certificate chain. The data entries could include, for example, manufacturer names, product line names, operator names, customer names, serial numbers or other identification information associated with an operator or customer, and/or other attributes of a certificate.

As used herein, a "mapping" refers to a correspondence between two sets of information. In various embodiments, when a set of information that is mapped to another set of information, information that is included in the set of information can be swapped with the corresponding information included in the other set of information. For example, a given node could have a serial number of "ABC1233XYZ." A data entry included in a certificate of the given node could have a data value of "ABC1233XYZ," indicating the serial number of the node. The compression dictionary of the node could map the data value, "ABC1233XYZ," to an index value of "10001." In various embodiments, the data value "ABC1233XYZ" in the uncompressed certificate is replaced with "1001" as part of generating a compressed certificate. Accordingly, when such a compressed certificated is decompressed, "1001" is replaced with "ABC1233XYZ" and the certificate is restored to its uncompressed form. Because the index values are smaller than the data entries they replace, the compressed certificate chain is smaller in size than the uncompressed certificate chain. Therefore, the node can conserve battery power by transmitting the compressed certificate chain instead of the uncompressed certificate chain.

Additionally, in some embodiments, each node stores one or more certificates in a certificate cache of the node. A node can further reduce network bandwidth utilization by determining which certificates are already stored at a neighboring node. The node only compresses and transmits the certificates in the uncompressed certificate chain that are not stored at the neighboring node. Accordingly, if the neighboring node already has all the certificates included in the certificate chain, then the node does not need to transmit any of those certificates to the neighboring node and only has to transmit its own client certificate. The neighboring node could then verify and authenticate the client certificate based on its stored certificates instead of the certificates included in the entire certificate chain.

In some embodiments, as part of a certificate exchange, the node exchanges compression dictionary information with the neighboring node to update the compression dictionary of the node and/or the neighboring node. In such embodiments, the node transmits its compression dictionary or one or more portions thereof to the neighboring node. The neighboring node determines, based on the compression dictionary, which certificates are stored at the node. The neighboring node transmits one or more certificates that include data entries that are not included in the compression dictionary to the node. The node updates its compression dictionary based on the one or more certificates received from the neighboring node. Additionally, the node could store the one or more certificates for later use. These operations are described in greater detail below in conjunction with FIG. 1.

FIG. 1 illustrates an example call flow diagram 100 showing interactions between two nodes of a network, according to various embodiments. Although the interactions between the two nodes are shown in an order, persons skilled in the art will understand that the interactions may be performed in a different order, interactions may be repeated or skipped, and/or may be performed by components other than those described in FIG. 1.

As shown in FIG. 1, a client node 110 is requesting to establish communications with a server node 120. Each of client node 110 and server node 120 can be any type of node included in a network, such as a border router node, a mains-powered device (MPD) node, or a battery-powered device (BPD) node. An example network is described in additional detail below in reference to FIG. 5. Additionally, the nodes are referred to herein as a client node 110 and a server node 120 for clarity in the context of the techniques disclosed herein. In various embodiments, a given node can act as a client node in a first interaction and as a server node in a second interaction. Similarly, a server node can act as a client node in other interactions.

Client node 110 transmits a client compression dictionary 130 to server node 120. The client compression dictionary 130 is the compression dictionary stored and maintained by client node 110. In some embodiments, transmitting the client compression dictionary 130 includes transmitting a set of index values included in the compression dictionary and, for each index value, a data entry corresponding to the index value. In various embodiments, client compression dictionary 130 includes a static portion and a dynamic portion. As discussed in further detail in reference to FIG. 4, the static portion is pre-populated with mappings between indices and data entries that recur across certificate chains and the dynamic portion is updated during operation of the client node 110.

In some embodiments, transmitting the client compression dictionary 130 includes identifying a subset of data entries included in the compression dictionary of the client node 110 that should be transmitted to server node 120. In some embodiments, the subset of data entries includes one or more data entries that can be used to identify the certificates associated with the compression dictionary, i.e., the certificates that are stored in the certificate cache of client node 110. Data entries that can be used to identify a certificate include, for example, a subject or issuer name, such as an operator name or customer name, and/or a serial number such as an operator serial number or customer serial number, and/or the like. In some embodiments, the subset of data entries includes one or more data entries that are included in a dynamic portion of the compression dictionary. In some embodiments, the subset of data entries includes one or more data entries that can be used to identify the certificates associated with an uncompressed certificate chain of client node 110. For example, client node 110 could include a plurality of uncompressed certificate chains, where each uncompressed certificate chain is used to establish communications with different types of nodes (e.g., a border router node, MPD node, or BPD node), nodes belonging to different customers or operators, using different types of security protocols (e.g., application layer or link layer), and/or the like. Client node 110 could identify a particular uncompressed certificate chain to utilize when establishing communications with server node 120. Client node 110 transmits the subset of data entries to server node 120 as part of the client compression dictionary 130. Additionally, client node 110 could transmit the subset of index values corresponding to the subset of data entries.

In response to receiving the client compression dictionary 130 from client node 110, server node 120 performs one or more operations 132 to validate the client compression dictionary 130. In some embodiments, server node 120 determines, based on the data entries included in the client compression dictionary 130, one or more certificates corresponding to the data entries. In various embodiments, server node 120 can validate the client compression dictionary 130 by comparing the one or more certificates with one or more expected certificates, a list of one or more allowed certificates, and/or a list of one or more revoked certificates. For example, if the one or more certificates includes all of the expected certificates and/or if each certificate is included in the list of allowed certificates, then server node 120 successfully validates the client compression dictionary 130. If the one or more certificates include one or more revoked certificates and/or if the one or more certificates do not include one or more expected certificates, then server node 120 fails to validate the client compression dictionary 130.

In some embodiments, server node 120 validates the client compression dictionary 130 by comparing the data entries included in the client compression dictionary 130 with one or more expected data entry values, a list of one or more allowed data entry values, and/or a list of one or more revoked data entry values. The one or more expected data entry values could include, for example, a customer name and/or identifier associated with server node 120, an operator name and/or identifier associated with the server node 120, names or identifiers associated with intermediary certificate authorities, a name or identifier associated with a root certificate, and the like. For example, server node 120 could determine whether the customer name of the server node 120 is included in the data entries included in the client compression dictionary 130. If the customer name of the server node 120 is included in the client compression dictionary 130, then server node 120 and client node 110 have matching customer names and belong to the same customer or organization. If the customer name of the server node 120 is not included in the client compression dictionary 130, then client node 110 has certificates that include a different customer name than server node 120 and belong to different customers or organizations. In various embodiments, server node 120 fails the validation if server node 120 determines, based on the data entries included in client compression dictionary 130, that the client node 110 belongs to a different customer or organization than server node 120.

If the client compression dictionary 130 fails validation, then server node 120 can terminate the connection with client node 110 without taking any further actions, such as performing a certificate exchange or performing any cryptographic operations. Accordingly, server node 120 can use the client compression dictionary 130 from client node 110 to quickly decide whether to continue establishing a connection with client node 110, which saves client node 110 and server node 120 both processing time and network bandwidth.

If the client compression dictionary 130 is successfully validated, then server node 120 performs one or more operations 134 to identify one or more certificates 136(A) that should be transmitted to client node 110. Additionally, in some embodiments, server node 120 stores the client compression dictionary 130 in association with client node 110. As discussed in further detail below, server node 120 can use the client compression dictionary 130 to compress certificates transmitted to client node 110 and decompress certificates received from client node 110.

In some embodiments, server node 120 determines one or more certificates that are included in the certificate cache of client node 110 based on the data entries included in the client compression dictionary 130. Server node 120 compares the one or more certificates included in the certificate cache of client node 110 to one or more certificates included in the certificate cache of server node 120 to identify one or more certificates that are included in the certificate cache of server node 120 but not are not included in the certificate cache of client node 110. In some embodiments, server node 120 compares the one or more certificates included in the certificate cache of client node 110 to one or more certificates included in an uncompressed certificate chain of server node 120. For example, server node 120 could include one or more uncompressed certificate chains and identify a particular uncompressed certificate chain to utilize for establishing communications with client node 110. In some embodiments, server node 120 compares the data entries included in the client compression dictionary 130 with the data entries included in the compression dictionary of server node 120. Server node 120 determines one or more data entries included in the compression dictionary of server node 120 that are not included in the client compression dictionary 130. Server node 120 determines one or more certificates that correspond to the one or more data entries.

Server node 120 transmits the one or more identified certificates as server certificates 136(A) to client node 110. In some embodiments, server node 120 performs one or more compression operations on the one or more identified certificates to generate one or more compressed certificates and transmit the one or more compressed certificates as server certificates 136(A) to client node 110. In some embodiments, server node 120 compresses the one or more identified certificates based on the client compression dictionary 130. In some embodiments, server node 120 compresses the one or more identified certificates based on the compression dictionary of the server node 120. Because the compression dictionary includes data entries that are not included in the client compression dictionary 130, the compressed certificates generated based on the compression dictionary of the server node 120 are often smaller in size than the compressed certificates generated based on the client compression dictionary 130. In such embodiments, the server node 120 also transmits a server compression dictionary 136(B) to client node 110. The server compression dictionary 136(B) includes the portion of the compression dictionary of server node 120 used to compress the one or more identified certificates. As explained in further detail below, the server compression dictionary 136(B) can be used by client node 110 to decompress the compressed certificates. In some embodiments, when transmitting the one or more certificates 136(A), server node 120 includes compression information that indicates the compression dictionary, e.g., one of the client compression dictionary 130 or the compression dictionary of server node 120, that was used to generate the compressed certificates.

In response to receiving the one or more server certificates 136(A), client node 110 performs one or more operations 140 to update the compression dictionary of client node 110 based on the one or more server certificates 136(A). In some embodiments, updating the compression dictionary includes generating one or more mappings between one or more index values and one or more data entries included in the one or more server certificates 136(A). In various embodiments, client node 110 parses the one or more server certificates 136(A) to determine data entries included in the one or more server certificates 136(A) that should be added to the compression dictionary of client node 110. Data entries that should be added to the compression dictionary of client node 110 could include, for example, a serial number, subject name and/or issuer name included in each certificate of the one or more server certificates 136(A). Client node 110 determines the number of data entries to be added to the compression dictionary of client node 110. Client node 110 generates a corresponding number of index values for mapping to the data entries. For example, if the index values included in the compression dictionary of client node 110 follow an order (e.g., numerical, alphabetical), client node 110 generates new index values based on the order, in various embodiments. Client node 110 maps the set of index values to the data entries, and the mappings are added to the compression dictionary of client node 110. In some embodiments, the mappings are added to a dynamic portion of the compression dictionary of client node 110. Additionally, in some embodiments, client node 110 stores the one or more certificates in a certificate cache of client node 110.

In some embodiments, the one or more server certificates 136(A) include compressed certificates, and performing the one or more operations 140 includes performing one or more decompression operations to decompress the compressed certificates. In some embodiments, client node 110 performs one or more decompression operations using the compression dictionary of client node 110. In some embodiments, client node 110 performs one or more decompression operations using the server compression dictionary 136(B). In some embodiments, when transmitting the one or more server certificates 136(A), server node 120 includes compression information that indicates the compression dictionary, . . . , one of the client compression dictionary 130 or the compression dictionary of server node 120, that was used to generate the compressed certificates. Client node 110 determines, based on the compression information, whether to decompress the compressed certificates using the server compression dictionary 136(B) received from server node 120 or the compression dictionary of client node 110. Client node 110 updates the compression dictionary of client node 110 based on the data entries included in the decompressed certificates.

In some embodiments, client node 110 identifies one or more uncompressed portions of the one or more server certificates 136(A). Client node 110 updates the compression dictionary of client node 110 based on the data entries included in the uncompressed portions of the one or more server certificates 136(A). For example, if the one or more server certificates 136(A) were compressed using the client compression dictionary 130, then the uncompressed portions of the one or more server certificates 136(A) include data entries that were not mapped to an index value in the client compression dictionary 130. Client node 110 generates one or more mappings between one or more new index values and one or more data entries included in the uncompressed portions of the one or more server certificates 136(A).

Optionally, in some embodiments, server node 120 transmits the server compression dictionary 136(B) to client node 110. In various embodiments, server node 120 can transmit the server compression dictionary 136(B) without including compressed certificates in the one or more server certificates 136(A). The server compression dictionary 136(B) is the compression dictionary stored and maintained by server node 120. In some embodiments, transmitting the client compression dictionary 130 includes transmitting a set of index values included in the compression dictionary and, for each index value, the data entry corresponding to the index value.

In some embodiments, transmitting the server compression dictionary 136(B) includes identifying a subset of data entries included in the compression dictionary 136(B) that should be transmitted to client node 110. In some embodiments, the subset of data entries includes one or more data entries that can be used to identify the certificates associated with the compression dictionary 136(B), i.e., the certificates that are stored in the certificate cache of server node 120. Data entries that can be used to identify a certificate include, for example, a subject or issuer name, such as an operator name or customer name, and/or a serial number such as an operator serial number or customer serial number, and the like. In some embodiments, the subset of data entries includes one or more data entries that can be used to identify the certificates associated with an uncompressed certificate chain. For example, server node 120 could include a plurality of uncompressed certificate chains, where each uncompressed certificate chain is used to establish communications with different types of nodes (e . . . , a border router node, MPD node, or BPD node), nodes belonging to different customers or operators, using different types of security protocols (e.g., application layer or link layer), and/or the like. Server node 120 could identify a particular uncompressed certificate chain to utilize when establishing communications with client node 110. In some embodiments, the subset of data entries includes one or more data entries that are included in the dynamic portion of the compression dictionary of server node 120. Server node 120 transmits the subset of data entries to client node 110. Additionally, server node 120 could transmit the subset of index values corresponding to the subset of data entries.

In response to receiving the server compression dictionary 136(B), client node 110 performs one or more operations 138 to validate the server compression dictionary 136(B). In some embodiments, client node 110 determines, based on the data entries included in the server compression dictionary 136(B), one or more certificates corresponding to the data entries. Client node 110 validates the server compression dictionary 136(B) by comparing the one or more certificates with one or more expected certificates, a list of one or more allowed certificates, and/or a list of one or more revoked certificates. For example, if the one or more certificates include all of the expected certificates and/or if each certificate is included in the list of allowed certificates, then client node 110 successfully validates the server compression dictionary 136(B). If the one or more certificates include one or more revoked certificates and/or if the one or more certificates do not include one or more expected certificates, then client node 110 fails to validate the server compression dictionary 136(B). In some embodiments, client node 110 validates the server compression dictionary 136(B) by comparing the data entries included in the server compression dictionary 136(B) with one or more expected data entry values, a list of one or more allowed data entry values, and/or a list of one or more revoked data entry values. For example, client node 110 could determine whether a customer name included in the data entries matches an expected customer name, such as the customer name associated with client node 110, and fail the validation of the server compression dictionary 136(B) if the customer name does not match the expected customer name.

If the server compression dictionary 136(B) fails validation, then client node 110 can terminate the connection with server node 120 without taking any further actions, such as performing a certificate exchange or performing any cryptographic operations. Accordingly, client node 110 can also use the server compression dictionary 136(B) from server node 120 to quickly decide whether to continue establishing a connection with server node 120.

If the server compression dictionary 136(B) is successfully validated, then client node 110 performs the one or more operations 140 to update the compression dictionary of client node 110 based on the one or more server certificates 136(A). In some embodiments, client node 110 also updates the compression dictionary of client node 110 based on the server compression dictionary 136(B). For example, client node 110 could determine that one or more mappings included in server compression dictionary 136(B) involve data entries that are not included in the compression dictionary of client node 110. Client node 110 adds the one or more mappings to the compression dictionary of client node 110.

Additionally, as shown in FIG. 1, client node 110 performs one or more operations 142 to identify one or more certificates that should be transmitted to server node 120. In some embodiments, client node 110 determines one or more certificates that are included in the certificate cache of server node 120 based on the data entries included in the server compression dictionary 136(B). Client node 110 compares the one or more certificates included in the certificate cache of server node 120 to one or more certificates included in the certificate cache of client node 110 to identify one or more certificates that are included in the certificate cache of client node 110 but not are not included in the certificate cache of server node 120. In some embodiments, client node 110 compares the one or more certificates included in the certificate cache of server node 120 to one or more certificates included in an uncompressed certificate chain of client node 110. In some embodiments, client node 110 compares the data entries included in the server compression dictionary 136(B) with the data entries included in the compression dictionary of client node 110. Client node 110 determines one or more data entries included in the compression dictionary of client node 110 that are not included in the server compression dictionary 136(B). Client node 110 determines one or more certificates that correspond to the one or more data entries. In some embodiments, client node 110 compares the data entries included in the server compression dictionary 136(B) with the data entries included in the client compression dictionary 130. Client node 110 determines one or more data entries included in the client compression dictionary 130 that are not included in the server compression dictionary 136(B).

Client node 110 transmits the one or more identified certificates to server node 120 as client certificates 144. In some embodiments, client node 110 performs one or more compression operations on the one or more identified certificates to generate one or more compressed certificates and transmit the one or more compressed certificates as client certificates 144 to server node 120. In some embodiments, client node 110 compresses the one or more identified certificates based on the server compression dictionary 136(B). In some embodiments, client node 110 compresses the one or more identified certificates based on the compression dictionary of the client node 110. In some embodiments, when transmitting the one or more client certificates 144, client node 110 includes compression information that indicates the compression dictionary, e.g., one of the server compression dictionary 136(B) or the compression dictionary of client node 110, that was used to generate the compressed certificates.

In response to receiving the one or more client certificates 144, server node 120 performs one or more operations 146 to update the compression dictionary of server node 120 based on the one or more client certificates 144. In some embodiments, updating the compression dictionary includes generating one or more mappings between one or more index values and one or more data entries included in the one or more client certificates 144. In various embodiments, server node 120 parses the one or more client certificates to determine data entries included in the one or more client certificates 144 that should be added to the compression dictionary of server node 120. Data entries that should be added to the compression dictionary of server node 120 could include, for example, a serial number, subject name and/or issuer name included in each certificate of the one or more client certificates 144. Server node 120 determines the number of data entries to be added to the compression dictionary of server node 120. Server node 120 generates a corresponding number of index values for mapping to the data entries. For example, if the index values included in the compression dictionary of server node 120 follow an order, server node 120 generates new index values based on the order. Server node 120 maps the set of index values to the data entries, and the mappings are added to the compression dictionary of server node 120. In some embodiments, the mappings are added to a dynamic portion of the compression dictionary. Additionally, in some embodiments, server node 120 stores the one or more client certificates 144 in a certificate cache of server node 120.

In some embodiments, the one or more client certificates 144 include compressed certificates, and performing the one or more operations 146 include performing one or more decompression operations to decompress the compressed certificates. In some embodiments, server node 120 performs the one or more decompression operations using the compression dictionary of server node 120. In some embodiments, server node 120 performs the one or more decompression operations using the client compression dictionary 130 previously received from client node 110. In some embodiments, server node 120 also receives compression information that indicates the compression dictionary used by client node 110 to generate the compressed certificates. Server node 120 determines, based on the compression information, whether to decompress the compressed certificates using the compression dictionary of server node 120 or the client compression dictionary 130 received from client node 110. Server node 120 updates the compression dictionary based on the data entries included in the decompressed certificates. In some embodiments, server node 120 identifies one or more uncompressed portions of the one or more client certificates 144. Server node 120 updates the compression dictionary of server node 120 based on the data entries included in the uncompressed portions of the one or more client certificates 144.

One benefit of the above techniques is that when the nodes 110 and 120 identify one or more certificates that should be transmitted to the other node, the number of identified certificates can be less than the number of certificates included in a certificate chain. Because the nodes are able to transmit fewer certificates to the other node, the nodes consume less battery power and network bandwidth compared to transmitting all of the certificates included in a certificate chain. Additionally, by compressing the certificates that are transmitted, the nodes can further reduce the amount of battery power and bandwidth consumed. Furthermore, with the above techniques, nodes 110 and 120 can update their corresponding compression dictionary and certificate cache with missing data entries and certificates from a certificate chain, respectively, without receiving all of the certificates in the entire certificate chain.

Although embodiments are described herein with reference to battery-powered devices establishing communications with neighboring nodes, client node 110 and server node 120 can be any entities in a network that communicate, either directly or indirectly, with each other. Using the above techniques, a non-battery-powered device can reduce the amount of network bandwidth consumed when exchanging certificates with another network device.

Figure 2:
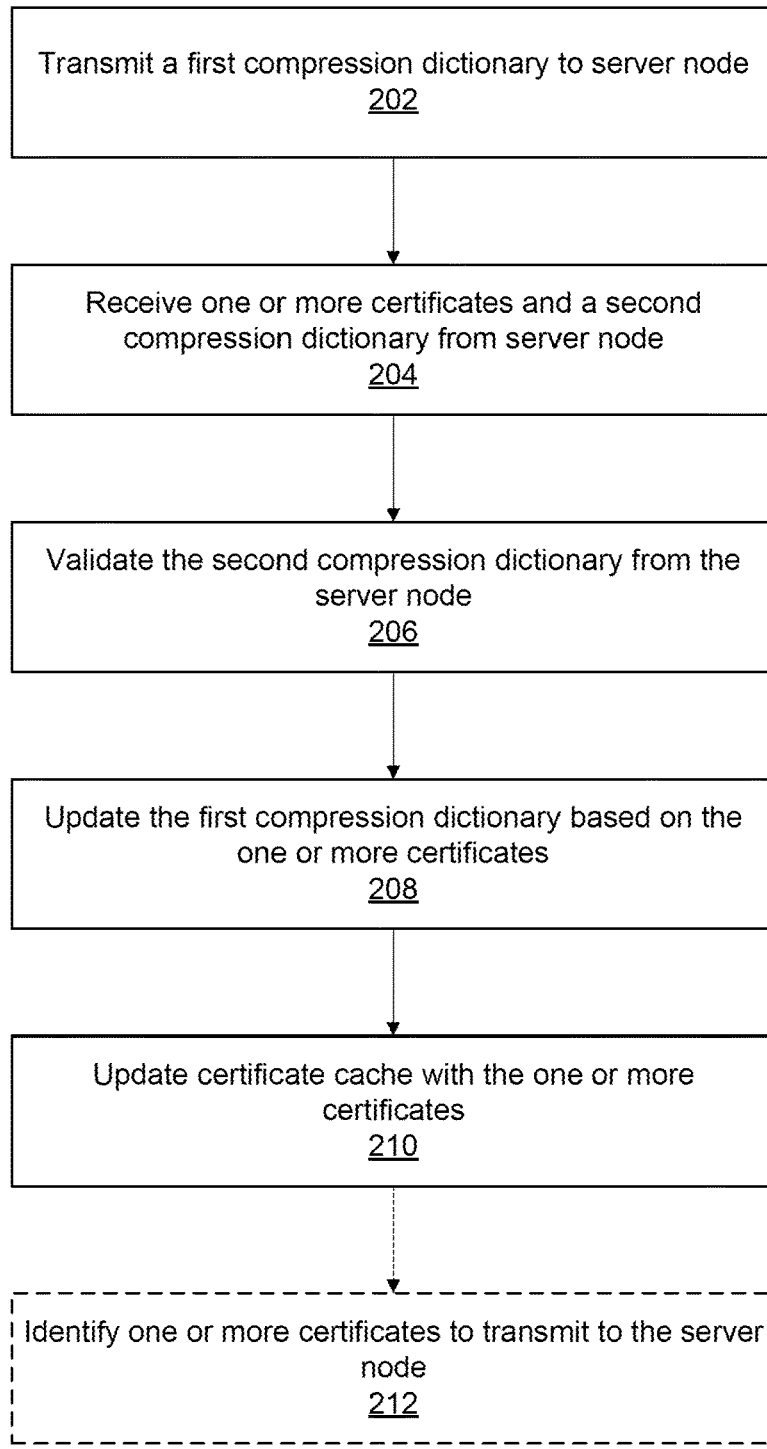
FIG. 2 illustrates an example flow diagram of method steps for a client node receiving certificates from a server node, according to various embodiments.

FIG. 2 sets forth a flow diagram of method steps 200 for a client node receiving certificates from a server node, according to various embodiments. Although the method steps are described with reference to the call flows of FIG. 1, persons skilled in the art will understand that any system configured to implement the method steps, in any order, falls within the scope of the present invention.

As shown in FIG. 2, method 200 begins at step 202, where a client node transmits a first compression dictionary to a server node. For example, client node 110 transmits client compression dictionary 130 to server node 120. In some embodiments, transmitting the first compression dictionary includes transmitting the set of index values included in compression dictionary of the client node and, for each index value, the data entry corresponding to the index value. In some embodiments, transmitting the client compression dictionary 130 includes identifying a subset of data entries included in the compression dictionary that should be transmitted to the server node. The subset of data entries could be, for example, one or more data entries that identify the certificates stored in a certificate cache of the client node, one or more data entries that identify the certificates included in an uncompressed certificate chain of the client node, and/or one or more data entries that are included in a dynamic portion of the compression dictionary.

At step 204, the client node receives one or more certificates and a second compression dictionary from the server node. The second compression dictionary corresponds to a compression dictionary of the server node, or a portion thereof. For example, client node 110 receives one or more certificates 136(A) and server compression dictionary 136(B) from server node 120.

At step 206, the client node validates the second compression dictionary received from the server node. For example, client node 110 validates the server compression dictionary 136(B) from server node 120. Validating the second compression dictionary is performed in a manner similar to that discussed above with respect to client node 110 and server compression dictionary 136(B). In some embodiments, the client node determines, based on the data entries included in the second compression dictionary, one or more certificates corresponding to the data entries. The client node compares the one or more certificates with one or more expected certificates, a list of one or more allowed certificates, and/or a list of one or more revoked certificates to validate the second compression dictionary. In some embodiments, the client node compares the data entries included in the second compression dictionary with one or more expected data entry values, a list of one or more allowed data entry values, and/or a list of one or more revoked data entry values. If the client node fails to validate the second compression dictionary, the method 200 could then terminate.

If the client node successfully validates the second compression dictionary, then at step 208, the client node updates the first compression dictionary based on the one or more certificates received from the server node. For example, client node 110 updates its compression dictionary based on the one or more certificates 136(A) received from server node 120. In some embodiments, updating the first compression dictionary includes identifying one or more data entries included in the one or more certificates that should be added to the compression dictionary. The client node determines one or more index values to use for the one or more data entries based on the existing index values in the compression dictionary. The client node generates one or more mappings between the one or more index values and the one or more identified data entries. The one or more mappings are added to the compression dictionary of the client node.

In some embodiments, the client node also updates the first compression dictionary based on the second compression dictionary. For example, client node 110 updates its compression dictionary based on one or more data entries included in server compression dictionary 136(B).

At step 210, the client node updates its certificate cache 450 based on the one or more certificates. For example, client node 110 stores the one or more certificates 136(A) to its certificate cache. In some embodiments, if the one or more certificates 136(A) include compressed certificates, then the client node 110 decompresses the compressed certificates and stores the decompressed certificates in its certificate cache.

Optionally, at step 212, the client node identifies one or more certificates that should be transmitted to the server node and transmits the identified certificates to the server node. Identifying the one or more certificates is performed in a manner similar to that discussed above with respect to client node 110 and the one or more certificates 144. In some embodiments, the client node determines one or more certificates that are included in the certificate cache of the server node based on the data entries included in the second compression dictionary. The client node compares the one or more certificates included in the certificate cache of the server node to one or more certificates included in the certificate cache of the client node to identify one or more certificates that are included in the certificate cache of the client node but not are not included in the certificate cache of the server node. In some embodiments, the client node compares the one or more certificates included in the certificate cache of the server node to one or more certificates included in an uncompressed certificate chain of the client node to identify one or more certificates that are included in the uncompressed certificate chain of the client node but are not included in the certificate cache of the server node. In some embodiments, the client node compares the data entries included in the second compression dictionary with the data entries included in the first compression dictionary. The client node determines one or more data entries included in the first compression dictionary that are not included in the second compression dictionary and identifies one or more certificates from the certificate cache of the client node that correspond to the one or more data entries.

Figure 3:
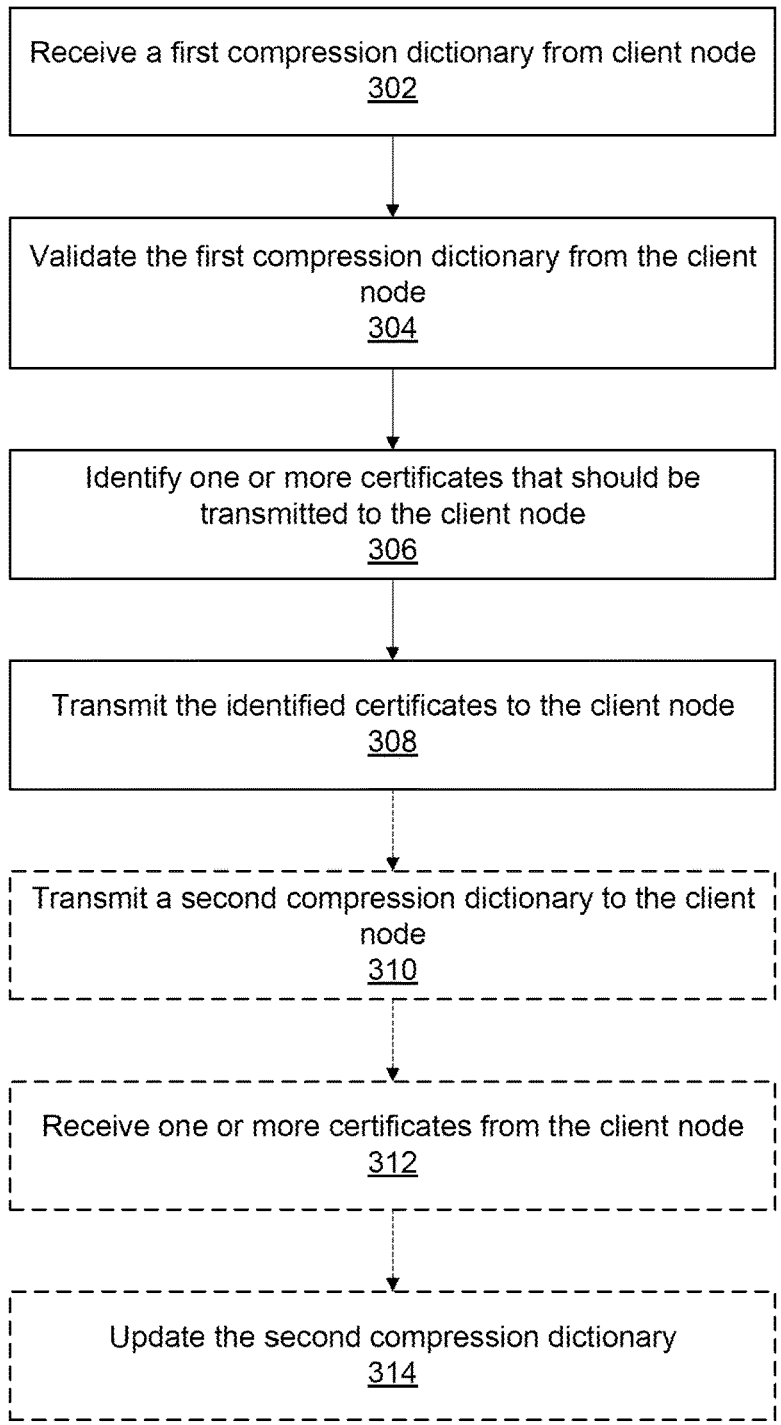
FIG. 3 illustrates an example flow diagram of method steps for a server node transmitting certificates to a client node, according to various embodiments.

FIG. 3 sets forth a flow diagram of method steps 300 for a server node transmitting certificates to a client node, according to various embodiments of the present invention. Although the method steps are described with reference to the call flows of FIG. 1, persons skilled in the art will understand that any system configured to implement the method steps, in any order, falls within the scope of the present invention.

As shown in FIG. 3, method 300 begins at step 302, where a server node receives a first compression dictionary from a client node. For example, server node 120 receives client compression dictionary 130 from client node 110.

At step 304, the server node validates the first compression dictionary received from the client node. For example, server node 120 validates the client compression dictionary 130 received from client node 110. Validating the first compression dictionary is performed in a manner similar to that discussed above with respect to server node 120 and client compression dictionary 130. In some embodiments, the server node determines, based on the data entries included in the second compression dictionary, one or more certificates corresponding to the data entries. The server node compares the one or more certificates with one or more expected certificates, a list of one or more allowed certificates, and/or a list of one or more revoked certificates to validate the second compression dictionary. In some embodiments, the server node compares the data entries included in the second compression dictionary with one or more expected data entries, one or more expected data entry values, a list of one or more allowed data entry values, and/or a list of one or more revoked data entry values. If the server node fails to validate the second compression dictionary, the method 300 could then terminate.

At step 306, the server node identifies one or more certificates that should be transmitted to the client node. For example, server node 120 identifies the one or more certificates 136(A) to be transmitted to client node 110. Identifying the one or more certificates that should be transmitted to the client node is performed in a manner similar to that discussed above with respect to server node 120 and the one or more certificates 136(A). In some embodiments, the server node determines one or more certificates that are included in the certificate cache of the neighboring node based on the data entries included in the first compression dictionary. The server node compares the one or more certificates included in the certificate cache of the client node to one or more certificates included in the certificate cache of the server node to identify one or more certificates that are included in the certificate cache of the server node but not are not included in the certificate cache of the client node. In some embodiments, the server node compares the one or more certificates included in the certificate cache of the client node to one or more certificates included in an uncompressed certificate chain of the server node to identify one or more certificates that are included in the certificate cache of the server node but are not included in the certificate cache of the client node. In some embodiments, the server node compares the data entries included in the first compression dictionary with the data entries included in the compression dictionary of the server node. The server node determines one or more data entries included in the compression dictionary that are not included in the first compression dictionary and identifies one or more certificates from the certificate cache of the server node that correspond to the one or more data entries.

After identifying the one or more certificates that should be transmitted to the client node, at step 308, the server node transmits the identified certificates to the client node. For example, server node 120 transmits the one or more server certificates 136(A) to client node 110. In some embodiments, transmitting the one or more identified certificates includes compressing the one or more identified certificates and transmitting the one or more compressed certificates. For example, server node 120 compresses the one or more identified certificates using the compression dictionary of server node 120 and/or the client compression dictionary 130 received from client node 110.

Optionally, at step 310, the server node transmits a second compression dictionary to the client node. For example, server node 120 transmits server compression dictionary 136(B) to client node 110. In some embodiments, transmitting the second compression dictionary includes transmitting the set of index values included in compression dictionary of the server node and, for each index value, the data entry corresponding to the index value. In some embodiments, transmitting the second compression dictionary includes identifying a subset of data entries included in the compression dictionary that should be transmitted to the client node. The subset of data entries could be, for example, one or more data entries that identify the certificates stored in a certificate cache of the server node and/or one or more data entries that are included in the dynamic portion of the compression dictionary. In some embodiments, the server node transmits the second compression dictionary in conjunction with the one or more identified certificates.

At step 312, the server node receives one or more certificates from the client node. For example, server node 120 receives the one or more certificates 144 from client node 110. In some embodiments, the one or more certificates 144 include one or more compressed certificates.

At step 314, the server node updates the second compression dictionary based on the one or more certificates received from the client node. For example, server node 120 updates its compression dictionary based on the one or more certificates 144 received from client node 110. In some embodiments, updating the second compression dictionary includes identifying one or more data entries included in the one or more certificates that should be added to the compression dictionary of the server node. In some embodiments, if the one or more certificates 144 include one or more compressed certificates, updating the second compression dictionary includes performing one or more decompression operations on the one or more compressed certificates. The server node updates the compression dictionary based on the data entries included in the decompressed certificates. In some embodiments, if the one or more certificates 144 include one or more compressed certificates, updating the second compression dictionary includes identifying one or more uncompressed portions of the one or more certificates. The server node updates the compression dictionary based on the data entries included in the uncompressed portions of the one or more certificates.

The server node determines one or more index values to use for the one or more data entries based on the existing index values in compression dictionary. The server node generates one or more mappings between the one or more index values and the one or more identified data entries. The one or more mappings are added to the compression dictionary of the server node. Additionally, in some embodiments, the server node stores the one or more certificates in the certificate cache of the server node. For example, server node 120 adds the one or more certificates 144 to its certificate cache. If the one or more certificates 144 included compressed certificates, then server node 120 decompresses the compressed certificates and adds the decompressed certificates to its certificate cache.

Example Node

Figure 4:
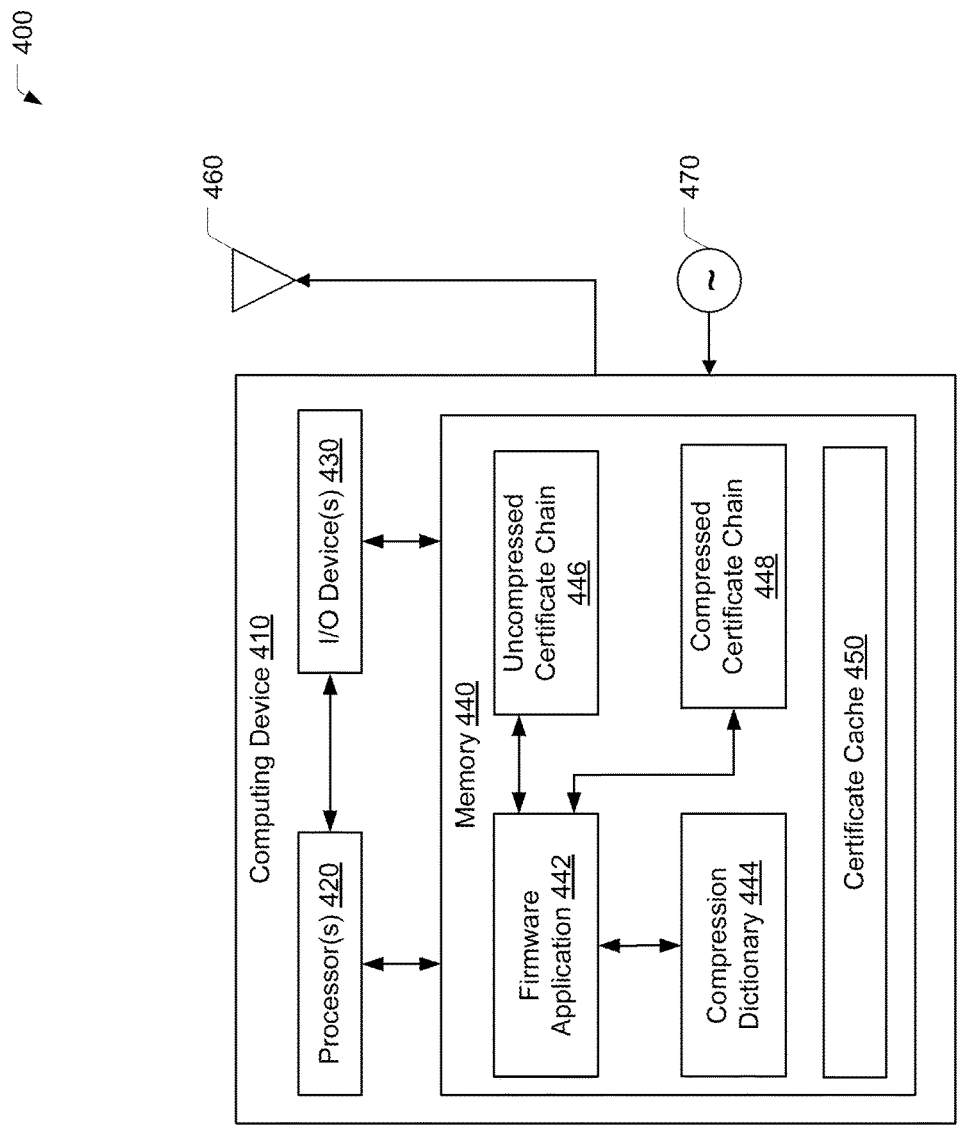
FIG. 4 an example node configured to implement one or more aspects of the present embodiments.

FIG. 4 illustrates an exemplary node that can be included in a network system and used to implement the techniques discussed above with respect to FIGS. 1-3. The node 400 is a network device and includes computing device hardware configured to perform various processing operations and execute program code. The node can further include various analog-to-digital and digital-to-analog converters, digital signal processors (DSPs), harmonic oscillators, transceivers, and any other components generally associated with RF-based communication hardware. In various embodiments, the node 400 includes a battery (not shown) that supplies power to the various computing device hardware included in node 400.

As shown, a node such as a BPD node, MPD node, or border router node, includes, without limitation, a computing device 410 coupled to a transceiver 460 and an oscillator 470. Computing device 410 coordinates the operations of the node. Transceiver 460 is configured to transmit and receive data packets across a network system using a range of channels and power levels. Oscillator 470 provides one or more oscillation signals according to which the transmission and reception of data packets can be scheduled.

Computing device 410 includes, without limitation, a processor 420, input/output (1/O) devices 430, and memory 440, coupled together. Processor 420 can include any hardware configured to process data and execute software applications. Processor 420 can include a real-time clock (RTC) (not shown) according to which processor 420 maintains an estimate of the current time. I/O devices 430 include devices configured to receive input, devices configured to provide output, and devices configured to both receive input and provide output. Memory 440 can be implemented by any technically feasible storage medium.

Memory 440 includes, without limitation, a firmware application 442, a compression dictionary 444, an uncompressed certificate chain 446, and a compressed certificate chain 448. Firmware application 442 includes program code that, when executed by processor 420, performs any of the node-oriented computing functionality described herein. During discovery, firmware application 442 interfaces with transceiver 460 to coordinate the exchange of data packets with other nodes across a network system based on timing signals generated by oscillator 470. Once the discovery process is complete, firmware application 442 causes the node to establish one or more encrypted communication channels with one or more neighboring nodes.

Compression dictionary 444 is the compression dictionary of the node 400. In various instances, compression dictionary 444 may be used as client compression dictionary 130 or server compression dictionary 136(B) as discussed above in reference to FIG. 1. Compression dictionary 444 includes mappings between index values and data entries that are included in one or more certificates. Node 400 compresses an uncompressed certificate using compression dictionary 444 by replacing data entries included in the certificate with the index value to which each data entry is mapped. Similarly, node 400 decompresses a compressed certificate by replacing index values included in the compressed certificate with the data entry to which each index value is mapped.

In some embodiments, compression dictionary 444 includes a static portion and a dynamic portion. The static portion of compression dictionary 444 can be pre-loaded on node 400 prior to deployment in a network. The static portion is pre-populated with mappings between indices and data entries that recur across certificate chains. Data entries that recur across certificate chains could include, for example, data that is common to multiple nodes such as a manufacturer name, a product line name, and the like. The dynamic portion of compression dictionary 444 is updated during operation of the node. The dynamic portion of compression dictionary 444 can include data entries that recur across certificate chains that are not included in the static portion of the compression dictionary 444, such as a customer name, an operator name, and/or other customer-specific certificate information.

Additionally, one or more certificates can be pre-loaded and stored on the node, for example, in a certificate cache 450. The one or more certificates could include certificates that are in the uncompressed certificate chain 446 of the node, such as a root certificate, an operator or customer root certificate, and/or a customer certificate that corresponds to the node. The static portion is additionally pre-populated with mappings between indices and data entries associated with the one or more certificates. As discussed above, the dynamic portion of compression dictionary 444 can be updated during operation of the node with mappings between indices and data entries associated with one or more certificates that are not initially stored in certificate cache 450.

Uncompressed certificate chain 446 includes various data entries that can be used to verify the identity of a node within network system 500. Compressed certificate chain 448 is a compressed version of uncompressed certificate chain 446. In some embodiments, uncompressed certificate chain 446 includes identifying information that the node provides to a neighboring node in order to establish an encrypted communication channel with the neighboring node. Uncompressed certificate chain 446 could include, for example, a customer certificate, an operator certificate, one or more intermediate certificates, a root certificate, and the like. In such embodiments, firmware application 442 is configured to perform a compression operation with uncompressed certificate chain 446 using compression dictionary 444 to generate compressed certificate chain 448. In so doing, firmware application 442 replaces data entries included in uncompressed certificate chain 446 with corresponding indices that are mapped to the data entries in compression dictionary 444. The indices consume fewer bits than the data entries. Thus, compressed certificate chain 448 has a smaller size compared to uncompressed certificate chain 446.

In some embodiments, uncompressed certificate chain 446 could include identifying information that a neighboring node provides to the node in order to establish an authenticated communication channel with the node. In such embodiments, firmware application 442 is configured to receive compressed certificate chain 448 from the neighboring node and then perform a decompression operation with compressed certificate chain 448 using compression dictionary 444 to generate uncompressed certificate chain 446. In so doing, firmware application 442 replaces indices included in compressed certificate chain 448 with indexed data entries extracted from compression dictionary 444.

System Overview

Figure 5:
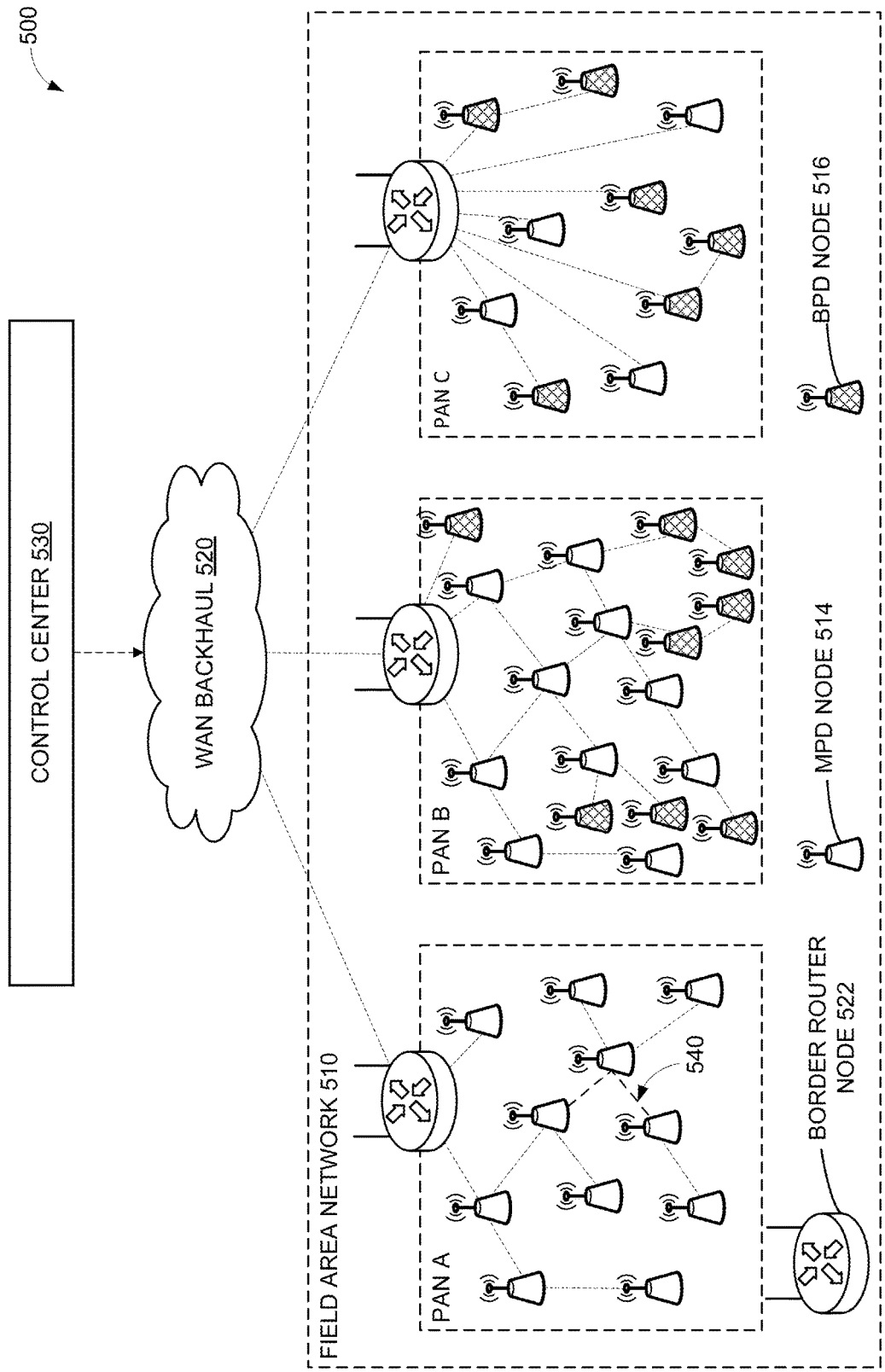
FIG. 5 illustrates a network system that includes the node of FIG. 4, according to various embodiments.

FIG. 5 illustrates a network system configured to implement one or more aspects of the present embodiments. As shown, network system 500 includes a field area network (FAN) 510, a wide area network (WAN) backhaul 520, and a control center 530. FAN 510 is coupled to control center 530 via WAN backhaul 520. Control center 530 is configured to coordinate the operation of FAN 510.

FAN 510 includes personal area network (PANs) A, B, and C. PANs A and B are organized according to a mesh network topology, while PAN C is organized according to a star network topology. Each of PANs A, B, and C includes at least one border router node 512 and one or more mains-powered device (MPD) nodes 514. PANs B and C further include one or more battery-powered device (BPD) nodes 516. Any of border router node 512, the one or more MPD nodes 514, or the BPD nodes 516 can be used to implement the techniques discussed above with respect to FIGS. 1-4.

MPD nodes 514 draw power from an external power source, such as mains electricity or a power grid. MPD nodes 514 typically operate on a continuous basis without powering down for extended periods of time. BPD nodes 516 draw power from an internal power source, such as a battery. BPD nodes 516 typically operate intermittently and power down, go to very low power mode, for extended periods of time in order to conserve battery power.

MPD nodes 514 and BPD nodes 516 are coupled to, or included within, a utility distribution infrastructure (not shown) that distributes a resource to consumers. MPD nodes 514 and BPD nodes 516 gather sensor data related to the distribution of the resource, process the sensor data, and communicate processing results and other information to control center 530. Border router nodes 512 operate as access points to provide MPD nodes 514 and BPD nodes 516 with access to control center 530.

Any of border router nodes 512, MPD nodes 514, and BPD nodes 516 are configured to communicate directly with one or more adjacent nodes via bi-directional communication links, such as bi-directional communication link 540. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN can implement a discovery protocol to identify one or more adjacent nodes or "neighbors." A node that has identified an adjacent, neighboring node can establish a bi-directional communication link with the neighboring node. Each neighboring node may update a respective neighbor table to include information concerning the other node, including the MAC address of the other node as well as a received signal strength indication (RSSI) of the communication link established with that node.

Nodes can compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node can generate a data packet and then transmit the data packet to a destination node via any number of intermediate nodes (in mesh network topologies). The data packet can indicate a destination for the packet and/or a particular sequence of intermediate nodes to traverse in order to reach the destination node. In one embodiment, each intermediate node can include a forwarding database indicating various network routes and cost metrics associated with each route.

Nodes can transmit data packets across a given PAN and across WAN backhaul 520 to control center 530. Similarly, control center 530 can transmit data packets across WAN backhaul 520 and across any given PAN to a particular node included therein. As a general matter, numerous routes can exist which traverse any of PANs A, B, and C and include any number of intermediate nodes, thereby allowing any given node or other component within network system 500 to communicate with any other node or component included therein.

Control center 530 includes one or more server machines (not shown) configured to operate as sources for, or destinations of, data packets that traverse within network system 500. The server machines can query nodes within network system 500 to obtain various data, including raw or processed sensor data, power consumption data, node/network throughput data, status information, and so forth. The server machines can also transmit commands and/or program instructions to any node within network system 500 to cause those nodes to perform various operations. In one embodiment, each server machine is a computing device configured to execute, via a processor, a software application stored in a memory to perform various network management operations.

In sum, when exchanging messages with a second node, a first node transmits its compression dictionary to the second node. The compression dictionary indexes various data entries that occur across many certificate chains and/or repeat within a particular certificate chain. The first node can compress a given certificate chain by replacing data entries within the given certificate chain with indices to corresponding data entries in the compression dictionary. The data entries included in the compression dictionary indicate the certificates that the first node has stored in its certificate cache.

The second node determines, based on the compression dictionary received from the first node, which certificates are included in the certificate cache of the first node and whether any certificates should be transmitted to the first node, such as one or more certificates that are included in the certificate chain of the second node but are not included in the certificate cache of the node. The second node includes the one or more certificates in its response to the first node. Additionally, the second node can compress the one or more certificates prior to transmitting the one or more certificates to the first node.

After receiving the response, the first node updates its compression dictionary based on the one or more certificates. Additionally, the second node includes its own compression dictionary in the response to the node. The first node can also update its compression dictionary based on the compression dictionary of the second node. The first node determines which certificates are included in the certificate cache of the second node and whether any certificates should be transmitted to the second node.

1. In some embodiments, a method comprises receiving, at a server node from a client node, a client compression dictionary that includes one or more first mappings between one or more first index values and one or more data entries included in a certificate cache of the client node; identifying, in response to receiving the client compression dictionary and based on the client compression dictionary, one or more certificates that should be transmitted to the client node; and transmitting, from the server node to the client node, the one or more identified certificates.

2. The method of clause 1, further comprising storing, at the server node, a server compression dictionary that includes one or more second mappings between one or more second index values and one or more data entries included in a certificate cache of the server node; wherein identifying the one or more certificates is further based on the server compression dictionary.

3. The method of clause 1 or 2, wherein identifying the one or more certificates comprises identifying one or more data entries included in the server compression dictionary that are not included in the client compression dictionary; wherein the one or more certificates correspond to the one or more identified data entries.

4. The method of any of clauses 1-3, wherein transmitting the one or more identified certificates comprises compressing the one or more identified certificates based on at least one of the client compression dictionary or the server compression dictionary.

5. The method of any of clauses 1-4, wherein the one or more identified certificates includes only a client certificate of the server node.

6. The method of any of clauses 1-5, further comprising transmitting, from the server node to the client node, a server compression dictionary that includes one or more second mappings between one or more second index values and one or more data entries included in a certificate cache of the server node.

7. The method of any of clauses 1-6, further comprising receiving, at the server node from the client node, one or more second certificates; and updating, at the server node, the server compression dictionary based on the one or more second certificates.

8. The method of any of clauses 1-7, wherein the one or more second certificates comprise one or more compressed certificates, and the method further comprises decompressing, at the server node, the one or more compressed certificates.

9. The method of any of clauses 1-8, further comprising validating, at the server node, the client compression dictionary based on the one or more data entries; and identifying the one or more certificates and transmitting the one or more certificates in response to successfully validating the client compression dictionary.

10. The method of any of clauses 1-9, further comprising receiving, at the server node from a second client node, a second client compression dictionary that includes one or more third mappings between one or more third index values and one or more data entries included in a certificate cache of the second client node; validating the second client compression dictionary based on the one or more data entries included in a certificate cache of the second client node; and in response to failing to validate the second client compression dictionary, terminating a connection with the second client node.

11. In some embodiments, one or more non-transitory computer-readable media store instructions which, when executed by one or more processors, cause the one or more processors of a server node to perform operations comprising receiving, from a client node, client compression dictionary that includes one or more first mappings between one or more first index values and one or more data entries included in a certificate cache of the client node; determining, using the client compression dictionary, whether to transmit one or more certificates to the client node; and in response to determining that one or more certificates should be transmitted to the client node, transmitting the one or more certificates to the client node.

12. The one or more non-transitory computer-readable media of clause 11, wherein the operations further include storing a server compression dictionary that includes one or more second mappings between one or more second index values and one or more data entries included in a certificate cache of the server node; wherein determining whether to transmit the one or more certificates to the client node is further based on the server compression dictionary.

13. The one or more non-transitory computer-readable media of clause 11 or 12, wherein determining whether to transmit the one or more certificates to the client node comprises identifying one or more data entries included in the server compression dictionary that are not included in the client compression dictionary; wherein the one or more certificates correspond to the one or more data entries.

14. The one or more non-transitory computer-readable media of any of clauses 11-13, wherein determining whether to transmit the one or more certificates to the client node comprises determining, based on the client compression dictionary, a first set of certificates stored in the certificate cache of the client node.

15. The one or more non-transitory computer-readable media of any of clauses 11-14, wherein the operations further include comparing the first set of certificates with a second set of certificates store in a certificate cache of the server node, wherein the one or more certificates are included in the second set of certificates and are not included in the first set of certificates.

16. The one or more non-transitory computer-readable media of clauses 11-15, wherein the operations further include comparing the first set of certificates with a second set of certificates included in a certificate chain of the server node, wherein the one or more certificates are included in the second set of certificates and are not included in the first set of certificates.

17. In some embodiments, a network device comprises a transceiver; a processor; and a memory storing executable instructions that when executed by the processor cause the network device to: receive, via a transceiver and from a second network device, a compression dictionary that includes one or more mappings between one or more index values and one or more data entries included in a certificate cache of the second network device; identify, based on the received compression dictionary, one or more certificates that are not included in the certificate cache of the second network device; and transmit the one or more identified certificates to the second network device.

18. The network device of clause 17, wherein the received compression dictionary corresponds to a dynamically-updated portion of a compression dictionary of the second network device.

19. The network device of clause 17 or 18, wherein the one or more data entries include one or more data entries that identify one or more certificates included in the certificate cache of the second network device.

20. The network device of any of clauses 17-19, wherein the one or more certificates that are not included in the certificate cache of the second network device include a client certificate associated with the network device.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
    receiving, at a server node from a client node, a client compression dictionary that includes one or more first mappings between one or more first index values and one or more first data entries, the one or more first data entries identifying one or more first certificates that are included in a certificate cache of the client node; and
    in response to the server node receiving the client compression dictionary;
        processing, by the server node, the one or more first data entries to identify the one or more first certificates that are included in the certificate cache of the client node;
        identifying, by the server node, one or more second certificates that are not included in the one or more first certificates and should be transmitted to the client node; and
        transmitting, from the server node to the client node, the one or more second certificates.

2. The method of claim 1, further comprising:
    storing, at the server node, a server compression dictionary that includes one or more second mappings between one or more second index values and one or more second data entries included in a certificate cache of the server node;
    wherein identifying the one or more second certificates is further based on the server compression dictionary.

3. The method of claim 2, wherein identifying the one or more second certificates comprises:

identifying, from the one or more second data entries, a subset of data entries included in the server compression dictionary that are not included in the client compression dictionary;

wherein the one or more second certificates correspond to the subset of data entries.

4. The method of claim 2, wherein transmitting the one or more second certificates comprises compressing the one or more second certificates based on at least one of the client compression dictionary or the server compression dictionary.

5. The method of claim 1, wherein the one or more second certificates includes only a client certificate of the server node.

6. The method of claim 1, further comprising transmitting, from the server node to the client node, a server compression dictionary that includes one or more second mappings between one or more second index values and one or more second data entries, the one or more second data entries identifying the one or more second certificates that are in a certificate cache of the server node.

7. The method of claim 6, further comprising:
receiving, at the server node from the client node, one or more third certificates; and
updating, at the server node, the server compression dictionary based on the one or more third certificates.

8. The method of claim 7, wherein:
the one or more third certificates comprise one or more compressed certificates, and
the method further comprises decompressing, at the server node, the one or more compressed certificates.

9. The method of claim 1, further comprising:
validating, at the server node, the client compression dictionary based on the one or more first data entries; and
in response to successfully validating the client compression dictionary:
identifying, by the server node, the one or more second certificates, and
transmitting, from the server node to the client node, the one or more second certificates in response to successfully validating the client compression dictionary.

10. The method of claim 9, further comprising:
receiving, at the server node from a second client node, a second client compression dictionary that includes one or more third mappings between one or more third index values and one or more third data entries included in a certificate cache of the second client node;
validating, by the server node, the second client compression dictionary based on the one or more third data entries included in a certificate cache of the second client node; and
in response to failing to validate the second client compression dictionary, terminating, by the server node, a connection with the second client node.

11. One or more non-transitory computer-readable media storing instructions which, when executed by one or more processors, cause the one or more processors of a server node to perform operations comprising:
receiving, from a client node, a client compression dictionary that includes one or more first mappings between one or more first index values and one or more first data entries, the one or more first data entries identifying one or more first certificates that are included in a certificate cache of the client node; and in response to receiving the client compression dictionary:
determining, using the one or more first data entries the one or more first certificates that are included in the certificate cache of the client node,
determining whether to transmit one or more second certificates to the client node; wherein the one or more second certificates are not included in the one or more first certificates, and
in response to determining that the one or more second certificates should be transmitted to the client node, transmitting the one or more second certificates to the client node.

12. The one or more non-transitory computer-readable media of claim 11, wherein the operations further include:
storing a server compression dictionary that includes one or more second mappings between one or more second index values and one or more second data entries, the one or more second data entries identifying the one or more second certificates included in a certificate cache of the server node;
wherein determining whether to transmit the one or more second certificates to the client node is further based on the server compression dictionary.

13. The one or more non-transitory computer-readable media of claim 12, wherein determining whether to transmit the one or more second certificates to the client node comprises:
identifying, from the one or more second data entries, a subset of data entries included in the server compression dictionary that are not included in the client compression dictionary;
wherein the one or more second certificates correspond to the subset of data entries.

14. A network device comprising:
a transceiver;
a processor; and
a memory storing executable instructions that, when executed by the processor, cause the network device to:
receive, via a transceiver and from a second network device, a compression dictionary that includes one or more first mappings between one or more first index values and one or more first data entries, the one or more first data entries identifying one or more first certificates that are included in a certificate cache of the second network device;
in response to receiving the compression dictionary:
processing the one or more first data entries to identify the one or more first certificates that are included in the certificate cache of the second network device,
identifying one or more second certificates as not included in the certificate cache of the second network device; and
transmit the one or more second certificates to the second network device.

15. The network device of claim 14, wherein the received compression dictionary corresponds to a dynamically-updated portion of a compression dictionary of the second network device.

16. The network device of claim 14, wherein the one or more second certificates that are not included in the certificate cache of the second network device include a client certificate associated with the network device.

17. The network device of claim 14, wherein the executable instructions further cause the network device to:
store, at the network device, a local compression dictionary that includes one or more second mappings between one or more second index values and one or more second data entries that are included in a certificate cache of the network device;
wherein identifying the one or more second certificates is further based on the local compression dictionary.

\* \* \* \* \*